(12) United States Patent
Rajagopal (10) Patent No.: US 11,645,104 B2
(45) Date of Patent: May 9, 2023

(54) INTELLIGENT DATA PLANE ACCELERATION BY OFFLOADING TO DISTRIBUTED SMART NETWORK INTERFACES

(71) Applicant: RELIANCE JIO INFOCOMM USA, INC., Frisco, TX (US)

(72) Inventor: Arun Rajagopal, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 189 days.

(21) Appl. No.: 17/130,668

(22) Filed: Dec. 22, 2020

(65) Prior Publication Data

US 2022/0197681 A1    Jun. 23, 2022

(51) Int. Cl.
| | |
|---|---|
| H04L 29/08 | (2006.01) |
| H04L 15/16 | (2006.01) |
| G06F 9/455 | (2018.01) |
| H04L 29/06 | (2006.01) |
| G06F 15/16 | (2006.01) |
| H04L 12/46 | (2006.01) |
| H04L 12/66 | (2006.01) |
| H04L 12/911 | (2013.01) |

(Continued)

(52) U.S. Cl.
CPC .......... *G06F 9/45558* (2013.01); *H04L 67/12* (2013.01); *H04L 67/51* (2022.05); *H04L 67/61* (2022.05); *H04L 67/62* (2022.05); *G06F 2009/45595* (2013.01)

(58) Field of Classification Search
CPC ....... G06F 9/45558; G06F 2009/45595; G06F 11/2002; H04L 67/12; H04L 67/51; H04L 67/61; H04L 67/62

USPC ............................................................ 718/1
See application file for complete search history.

(56) References Cited

U.S. PATENT DOCUMENTS 8,131,880 B2 * 3/2012 Boucher ............. H04L 49/9052
709/250
8,266,275 B2    9/2012 Xu et al.
(Continued)

FOREIGN PATENT DOCUMENTS

CN         101383732 A  *  3/2009  .......... G06F 11/2005
WO    WO-2018218259 A1  *  11/2018  .......... G06F 16/2255

OTHER PUBLICATIONS

Notification of Transmittal of the International Search Report and the Written Opinion of the International Search Authority—The European Patent Office—dated Mar. 22, 2022 for International Application No. PCT/US21/64509, 13 pages.

*Primary Examiner* — David R Lazaro
*Assistant Examiner* — Berhanu Shitayewoldetadik
(74) *Attorney, Agent, or Firm* — Jackson Walker LLP; Christopher J. Rourk (57) ABSTRACT

A system for processing data, comprising a compute node having a first processor that is configured to receive a digital data message containing a request for computing services and to allocate processing resources on a private network as a function of the request. A smart network interface controller (NIC) management system operating on a second processor and configured to cause the second processor to select a smart NIC associated with the private network to allocate the smart NIC to the computing services. The smart NIC includes a processor that is configured to interface with a public network and to send and receive data over the public network associated with the computing services.

20 Claims, 3 Drawing Sheets

(51) Int. Cl.
*H04L 67/51* (2022.01)
*H04L 67/61* (2022.01)
*H04L 67/62* (2022.01)
*H04L 67/12* (2022.01)

(56) References Cited

U.S. PATENT DOCUMENTS

| | | | |
|---|---|---|---|
| 8,468,244 B2 | 6/2013 | Redlich et al. | |
| 8,971,323 B2 | 3/2015 | Mithyantha et al. | |
| 9,047,243 B2 | 6/2015 | Taylor et al. | |
| 9,170,976 B2* | 10/2015 | Folco | G06F 1/3209 |
| 9,363,292 B2 | 6/2016 | Murgia et al. | |
| 9,467,454 B2 | 10/2016 | Aravindakshan et al. | |
| 9,491,161 B2 | 11/2016 | Suresh et al. | |
| 10,044,612 B2 | 8/2018 | C J et al. | |
| 10,148,496 B2 | 12/2018 | Tiwari et al. | |
| 11,231,950 B2* | 1/2022 | Kaplan | G06F 9/45558 |
| 11,392,417 B2* | 7/2022 | Bolkhovitin | G06F 3/0688 |
| 2006/0029097 A1 | 2/2006 | McGee et al. | |
| 2014/0089451 A1* | 3/2014 | Eran | G06F 12/08 709/213 |
| 2014/0214915 A1* | 7/2014 | Dragon | H04L 43/0817 709/201 |
| 2015/0139241 A1* | 5/2015 | Vincent | H04L 61/4505 370/392 |
| 2015/0355946 A1 | 12/2015 | Kang | |
| 2016/0013992 A1* | 1/2016 | Reddy | H04L 47/822 709/224 |
| 2016/0070921 A1* | 3/2016 | Coon | G06F 21/305 726/28 |
| 2016/0285971 A1* | 9/2016 | Bilas | H04L 69/22 |
| 2016/0294633 A1* | 10/2016 | Dragon | H04L 43/20 |
| 2018/0176886 A1* | 6/2018 | Kodaypak | H04W 76/10 |
| 2018/0203768 A1* | 7/2018 | Huang | G06F 11/079 |
| 2018/0205652 A1* | 7/2018 | Saxena | H04L 61/2514 |
| 2018/0285288 A1* | 10/2018 | Bernat | C07F 15/0033 |
| 2019/0108106 A1 | 4/2019 | Aggarwal et al. | |
| 2019/0121566 A1* | 4/2019 | Gold | G06N 3/063 |
| 2019/0199602 A1* | 6/2019 | Zhang | G06F 8/31 |
| 2019/0223055 A1* | 7/2019 | Bor Yaliniz | H04L 41/0896 |
| 2019/0294477 A1* | 9/2019 | Koppes | G06F 9/5077 |
| 2019/0339955 A1* | 11/2019 | Kuo | G06F 9/485 |
| 2019/0372804 A1* | 12/2019 | Li | H04L 41/0803 |
| 2019/0384642 A1* | 12/2019 | Bolkhovitin | G06F 3/067 |
| 2020/0036773 A1* | 1/2020 | Dar | H04L 67/63 |
| 2020/0073739 A1* | 3/2020 | Rungta | G06F 8/60 |
| 2020/0106669 A1* | 4/2020 | Dhillon | G06F 11/1438 |
| 2020/0136996 A1* | 4/2020 | Li | H04L 47/125 |
| 2020/0218676 A1 | 7/2020 | Cao et al. | |
| 2020/0257566 A1* | 8/2020 | Ganguli | H05K 7/1489 |
| 2020/0259763 A1* | 8/2020 | Guim Bernat | H04L 43/0858 |
| 2020/0344299 A1* | 10/2020 | Sohail | G06F 16/27 |
| 2021/0058388 A1* | 2/2021 | Knotwell | H04L 63/0823 |
| 2021/0144177 A1* | 5/2021 | Tsirkin | H04L 63/20 |
| 2021/0266368 A1* | 8/2021 | McBride | H04L 67/60 |
| 2021/0266376 A1* | 8/2021 | McBride | H04L 67/60 |
| 2022/0100432 A1* | 3/2022 | Kim | G06F 9/45558 |
| 2022/0100491 A1* | 3/2022 | Voltz | G06F 8/61 |
| 2022/0100544 A1* | 3/2022 | Voltz | G06F 9/45558 |
| 2022/0124074 A1* | 4/2022 | Petri | H04L 63/20 |
| 2022/0206962 A1* | 6/2022 | Kim | G06F 13/102 |
| 2022/0230218 A1* | 7/2022 | Ketchel, III | G16H 10/60 |
| 2022/0230219 A1* | 7/2022 | Ketchel, III | G06Q 30/0239 |
| 2022/0237677 A1* | 7/2022 | Ketchel, III | G06Q 20/381 |

* cited by examiner

INTELLIGENT DATA PLANE ACCELERATION BY OFFLOADING TO DISTRIBUTED SMART NETWORK INTERFACES

TECHNICAL FIELD

The present disclosure relates generally to data processing, and more specifically to intelligent data plane acceleration by offloading data processing to distributed smart network interfaces.

BACKGROUND OF THE INVENTION

Data networks can use a gateway with a network address translation table to route data to addresses on a private network, but these network address translation tables are generally not allocated to specific processes, and are instead used for all private network traffic over a public network.

SUMMARY OF THE INVENTION

A system for processing data is provided that includes a compute node having a first processor that is configured to receive a digital data message containing a request for computing services and to allocate processing resources on a private network as a function of the request. A smart network interface controller (NIC) management system operating on a second processor is configured to cause the second processor to select a smart NIC associated with the private network to allocate the smart NIC to the computing services. The smart NIC includes a processor that is configured to interface with a public network and to send and receive data over the public network associated with the computing services.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

Data plane acceleration by offloading packet treatment to smart network interface controllers (NICs) can be used to provide significant performance improvements for network applications that run on compute servers, such as for "on-demand" application support in cloud computing environments or other related applications. These smart NICs can be distributed across many servers, can be embedded in other network appliances like network switches, or can be provided in other suitable manners in a cloud computing environment or other similar applications.

Another manifestation of smart NICs is to provide "just a box of NICs," similar to the way that data storage is provided by "just a box of disks (JBOD)." Depending on the application mix running in the cloud on the associated servers or in other similar environments, the smart NICs might be lightly used on the local compute server, and could be leveraged by a different server to run other network applications in a distributed manner. This architecture can be used to increase the efficient utilization of cloud networking resources and to enhance application performance.

In a cloud computing environment, a registry and inventory of smart network interfaces can be maintained. Smart NICs from the inventory can then be assigned to applications in a manner that is similar to the way that compute cores or storage space is allocated to applications. Once the smart network interfaces are assigned to an application virtual machine (VM), container or other suitable computing construct, the application can program the smart network interface to perform tasks specific to the data plane application as if the application and smart network interface were resident on the same compute server.

Figure 1:
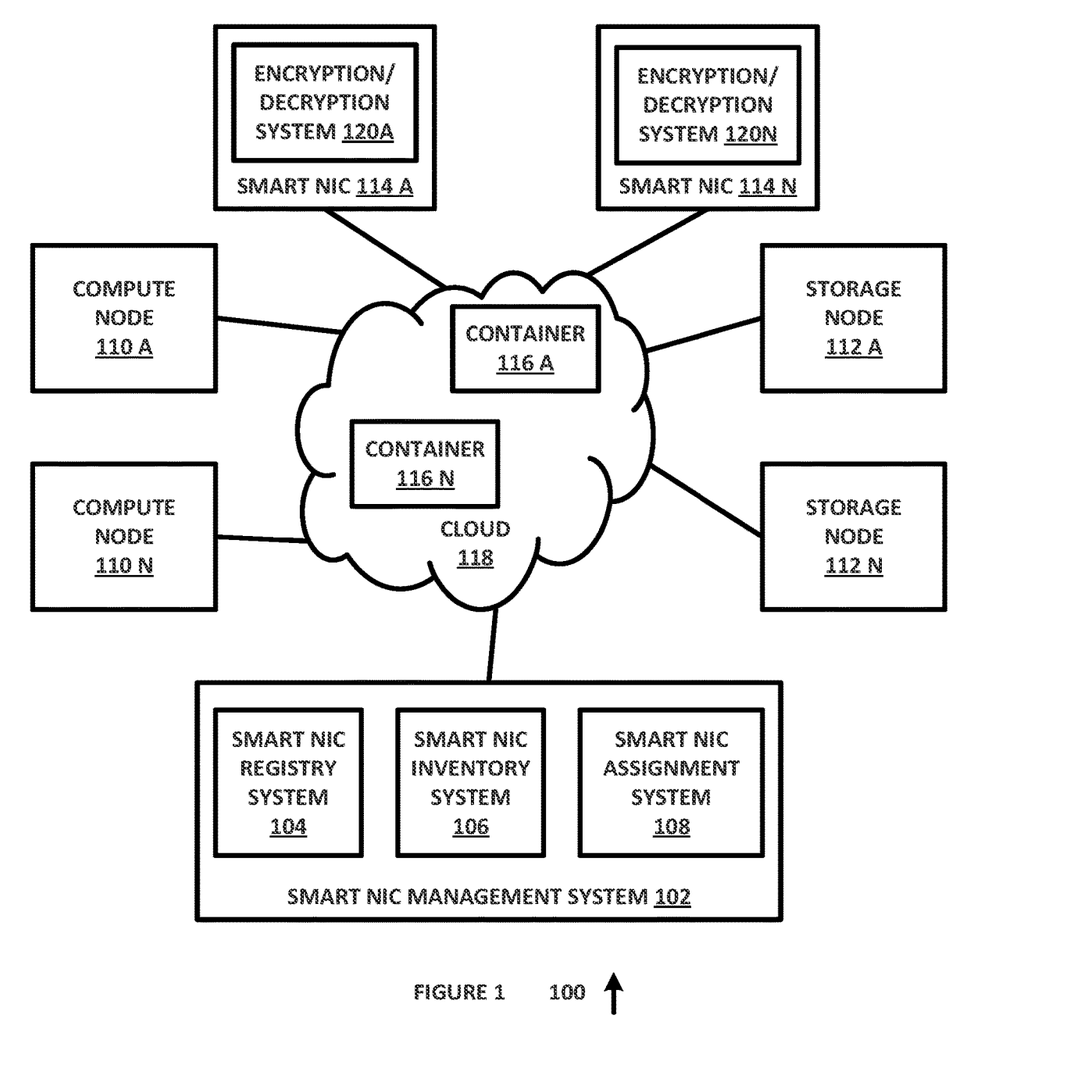
FIG. 1 is a diagram of a system for providing intelligent data plane acceleration by offloading applications to distributed smart network interfaces, in accordance with an example embodiment of the present disclosure.

FIG. 1 is a diagram of a system 100 for providing intelligent data plane acceleration by offloading applications to distributed smart network interfaces, in accordance with an example embodiment of the present disclosure. System 100 includes smart NIC management system 102, smart NIC registry system 104, smart NIC inventory system 106, smart NIC assignment system 108, compute nodes 110A through 110N, storage nodes 112A through 112N, smart NICs 114A through 114N, containers 116A through 116, cloud 118 and encryption/decryption systems 120A through 120N, each of which can be implemented in hardware or a suitable combination of hardware and software.

Smart NIC management system 102 can be implemented as one or more lines of code that are loaded into a memory of a processor and which cause the processor to perform management functions for a plurality of smart NICS in a cloud-based computing system or other suitable systems. In one example embodiment, smart NIC management system 102 can include a plurality of subsystems or can directly implement one or more functions associated with identifying smart NIC systems that are available for use in a cloud computing environment or other suitable computing environments. In this example embodiment, smart NIC management system 102 can be implemented as part of a cloud computing environment, a local area network, a wide area network or other suitable computing environments and can interface with smart NIC devices that are associated with the computing environment, such as smart NIC devices that are associated with a smart NIC server rack, with individual processing platforms within the computing environment or in other suitable manners.

Smart NIC registry system 104 can be implemented as one or more lines of code that are loaded into a memory of a processor and which cause the processor to perform registration functions for a plurality of smart NIC devices. In one example embodiment, a smart NIC registry can include an identification of active smart NIC devices, a correlation between an IP address for the active smart NIC devices and a network address for devices on the network, or other suitable registry-related information, where smart NIC registry system 104 can create, read, store, modify or otherwise functionally interact with associated registry data records stored in a data memory device. The devices on the network can include hardware devices, hardware devices with associated firmware or other suitable control data, containers, virtual machines or other suitable functional components.

Smart NIC inventory system 106 can be implemented as one or more lines of code that are loaded into a memory of a processor and which cause the processor to perform inventory functions for a plurality of smart NIC devices. In one example embodiment, a smart NIC inventory can include an identification of active smart NIC devices and inactive smart NIC devices, an identification of a location of smart NIC devices, an identification of functional capabilities of smart NIC devices and other suitable inventory-related information, where smart NIC inventory system 106 can create, read, store, modify or otherwise functionally interact with smart NIC inventory data records stored in a data memory device.

Smart NIC assignment system 108 can be implemented as one or more lines of code that are loaded into a memory of a processor and which cause the processor to perform the function of assigning a smart NIC to a device on the network. In one example embodiment, smart NIC assignment system 108 can monitor the functionality of an assigned smart NIC to determine whether it is necessary to assign a new smart NIC to a device, to de-allocate assigned devices from a smart NIC when the device is shut down or otherwise no longer requires smart NIC access, and other suitable functions. Smart NIC assignment system 108 can create, read, store, modify or otherwise functionally interact with smart NIC assignment data records stored in a data memory device.

Compute nodes 110A through 110N can be implemented as one or more lines of code that are loaded into a memory of a processor and which cause the processor to perform specific tasks that are allocated to the processor. In one example embodiment, cloud 118 can be implemented using compute nodes 110A through 110N, such that the functions associated with the cloud are allocated to one or more of compute nodes 110A through 110N through a suitable cloud processing management function. Compute nodes 110A through 110N can be instantiated as needed to support demand for processor functionality, and can be assigned or reassigned as needed to maintain sufficient processor resources for a current and expected load level. In another example embodiment, compute nodes 110A through 110N can function independently from cloud 118, and can be part of a local area network, a wide area network or other network architectures that can be used in conjunction with smart NIC management system 102 and associated systems and subsystems.

Storage nodes 112A through 112N can be implemented as one or more lines of code that are loaded into a memory of a processor and which cause the processor to perform specific tasks that are allocated to the associated storage node. In one example embodiment, cloud 118 can be implemented using storage nodes 112A through 112N, such that the data storage functions associated with the cloud are allocated to one or more of storage nodes 112A through 112N through a suitable cloud processing management function. Storage nodes 112A through 112N can be instantiated as needed to support demand for data storage functionality, and can be assigned or reassigned as needed to maintain sufficient data storage resources for a current and expected load level. In another example embodiment, storage nodes 112A through 112N can function independently from cloud 118, and can be part of a local area network, a wide area network or other network architectures that can be used in conjunction with smart NIC management system 102 and associated systems and subsystems.

Smart NICs 114A through 114N can be implemented as one or more lines of code that are loaded into a memory of a processor and which cause the processor to perform specific tasks that are allocated to the associated smart NIC. In one example embodiment, cloud 118 can be implemented using smart NICs 114A through 114N, such that the network interface functions associated with the cloud are allocated to one or more of smart NICs 114A through 114N through smart NIC management system 102 or other suitable cloud network interface management function. Smart NICs 114A through 114N can be instantiated as needed to support demand for network interface functionality, and can be assigned or reassigned as needed to maintain sufficient network interface resources for a current and expected load level. In another example embodiment, smart NICs 114A through 114N can function independently from cloud 118, and can be part of a local area network, a wide area network or other network architectures that can be used in conjunction with smart NIC management system 102 and associated systems and subsystems.

Containers 116A through 116N can be implemented as one or more lines of code that are loaded into a memory of a processor and which cause the processor to perform functions associated with a predetermined software application. In one example embodiment, containers 116A through 116N are instantiated using computing resources, data memory resources, network interface resources and other suitable resources, to allow predetermined and selected software applications to function as needed, on demand, when scheduled or in other suitable manners. In this regard, containers 116A through 116N are not software per se, but include software that has been loaded into data storage registers of processing platforms that are either independent or associated with other network functions such as data storage and network interface, and can be assigned to different network resources as a function of load level, device functional status or other constraints. Containers 116A through 116N can function like independent devices on the network, such as virtual machines or other suitable constructs.

Cloud 118 can be implemented as one or more lines of code that are loaded into memory devices for processors and which cause the processors to perform distributed data processing and computing functions. In one example embodiment, cloud 118 can be implemented in conjunction with the other components of system 100 as part of an integrated and distributed processing platform, or can be used with additional devices or processing elements, with classes of different devices or processing elements or in other suitable manners.

Encryption/decryption systems 120A through 120N can be implemented as one or more lines of code that are loaded into a memory of a processor of a corresponding smart NIC 114A through 114N, and which cause the processor to perform specific tasks that are allocated to the associated smart NIC. In one example embodiment, encryption/decryption systems 120A through 120N can be configured by the associated smart NIC 114A through 114N to perform predetermined encryption and decryption processing for data traffic being handled by that smart NIC, such as using encryption and decryption processes specific to those data packets. In this regard, encryption/decryption systems 120A through 120N of NICs 114A through 114N are not similar to a prior art NIC and an associated processor, because they allow dedicated encryption and decryption processing to be performed in a manner that would not be possible with a prior art NIC and an associated processor. In those prior art systems, the NIC would operate under control of the processor over the network or a system bus, which would allow encryption and decryption processing for the NIC to be compromised. Smart NICs 114A through 114N can provide a more secure environment for encryption/decryption systems 120A through 120N than was previously available. Likewise, other system processing can also or alternatively be performed by smart NICs 114A through 114N that would not be possible with a prior art NIC operating under control of a separate processor, such as firewall processing, TCP/IP processing, HTTP processing and other suitable processing.

In operation, system 100 allows a plurality of smart NIC devices to be used in a more efficient manner in a network, such as in a cloud computing environment or other suitable networks. System 100 leverages the ability of smart NIC devices to perform functions that would normally be performed by a dedicated processor associated with the NIC, so as to allow a smart NIC to provide network interface services to multiple processors, multiple containers or to other network devices.

System 100 disaggregates the networking component (such as smart NICs 114A through 114N) from a compute host (such as a server or compute node 110A through 110N) that is running an associated application. This allows a smart NIC registry system 104 to be maintained for use with a smart NIC inventory system 106 and associated allocation mechanisms, to assign resources from smart NICs 114A through 114N on demand to any suitable application that requires or requests those resources. The smart NICs 114A through 114N can independently process data packets associated with the application in a predetermined manner without needing to send the packets to the compute node (such as a container or virtual machine), such as for encryption/decryption processing, firewall processing, TCP/IP processing, HTTP processing or other suitable dedicated processing. In this manner, system 100 can be used to provide a network wide registrar of smart NIC resources and smart NIC availability information, such as for use in a cloud computing environment or for other suitable purposes.

Figure 2:
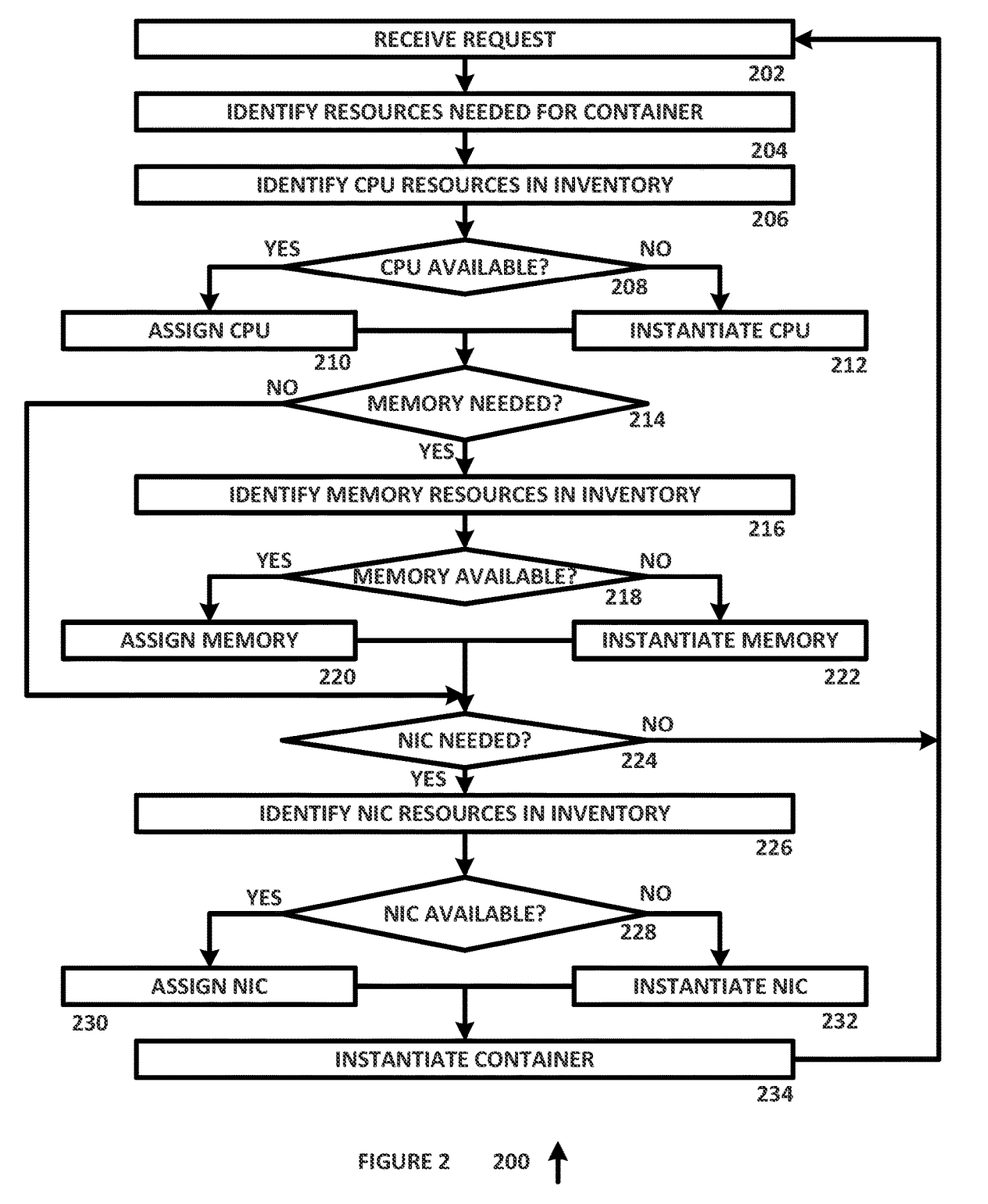
FIG. 2 is a diagram of an algorithm for providing intelligent data plane acceleration by offloading applications to distributed smart network interfaces, in accordance with an example embodiment of the present disclosure.

FIG. 2 is a diagram of an algorithm 200 for providing intelligent data plane acceleration by offloading applications to distributed smart network interfaces, in accordance with an example embodiment of the present disclosure. Algorithm 200 can be implemented in hardware or a suitable combination of hardware and software.

Algorithm 200 begins at 202, where a request for computing services is received. In one example embodiment, the request for computing services can be received as part of a cloud computing environment, such as where a user logs on to the cloud computing environment and is allocated computing services or in other suitable manners. The algorithm then proceeds to 204.

At 204, resources that are needed for a container or other suitable computing service construct are identified. In one example embodiment, containers can be used to provide cloud computing services, such as different containers for different services, a single container for each user or in other suitable manners. Likewise, virtual machines or other suitable constructs can be used in addition to or instead of containers. The algorithm then proceeds to 206.

At 206, active CPU resources in an inventory, registry or other suitable system are identified. In one example embodiment, active CPU resources can be allocated as needed to facilitate rapid deployment of services, or other suitable processes can also or alternatively be used. The algorithm then proceeds to 208.

At 208, it is determined whether CPU resources are available. If CPU resources are available, then the algorithm proceeds to 210, where a CPU is assigned to the request. Likewise, two or more CPUs can be assigned to a request for multiple independent processor services, or other suitable processes can also or alternatively be used. The algorithm then proceeds to 214.

If it is determined at 208 that CPU resources are not available, the algorithm proceeds to 212 where CPU resources are instantiated. In one example embodiment, the determination that CPU resources are not available can be associated with a level of CPU resources, where additional CPU resources are instantiated in order to provide additional capacity for increasing load levels. Likewise, the instantiated CPU resources can be allocated to the request received at 202 or in other suitable manners. The algorithm then proceeds to 214.

At 214, it is determined whether data memory is needed for the requested processing services, such as dedicated data memory space for short or long term data storage or other suitable data memory. If it is determined that data memory is needed, the algorithm proceeds to 216, otherwise the algorithm proceeds to 224.

At 216, data memory resources in an inventory, a registry or in or other suitable system are identified. In one example embodiment, active data memory resources can be allocated as needed to facilitate rapid deployment of services, or other suitable processes can also or alternatively be used. The algorithm then proceeds to 218.

At 218, it is determined whether data memory resources are available. If data memory resources are available, the algorithm proceeds to 220 where they are assign to the associated requested processor resources, devices, containers or other network resources. The algorithm then proceeds to 224. Otherwise, the algorithm proceeds to 222 where the data memory resources are instantiated, such as by activated available data storage devices or in other suitable manners. The algorithm then proceeds to 224.

At 224, it is determined whether a NIC is needed for requested processor resources. In one example embodiment, processor resources may not require any associated network access, may require a minimal level of network access, may require a large amount of network access, or other suitable determinations can be made. If it is determined that a NIC is not required, the algorithm returns to 202, otherwise the algorithm proceeds to 226.

At 226, smart NIC resources are identified in an inventory of smart NIC devices. In one example embodiment, the identification of smart NIC resources can include identifying smart NIC resources that are available for use, smart NIC resources that would need to be instantiated or other suitable smart NIC resources. The algorithm proceeds to 228.

At 228, it is determined whether an operating smart NIC is available. If it is determined that a smart NIC is available, the algorithm proceeds to 230, where it is assigned to the requested container, service, device or other suitable construct. The algorithm then proceeds to 234.

If it is determined at 228 that an operating smart NIC is not available, the algorithm proceeds to 232, where a smart NIC is instantiated. In one example embodiment, the smart NIC can be instantiated to increase capacity even where the smart NIC will not be assigned in response to the request. The algorithm then proceeds to 234.

At 234, the container is instantiated with the allocated CPU resources, data memory resources, smart NIC resources and other associated resources. The container is them provisioned for use.

In operation, algorithm 200 can be used to provide intelligent data plane acceleration by offloading applications to distributed smart network interfaces and other suitable functions. Although algorithm 200 is shown as a flow chart, a person of ordinary skill in the art will recognize that algorithm 200 can also or alternatively be implemented using object-oriented programming, a state diagram, a ladder diagram or in other suitable manners.

Figure 3:
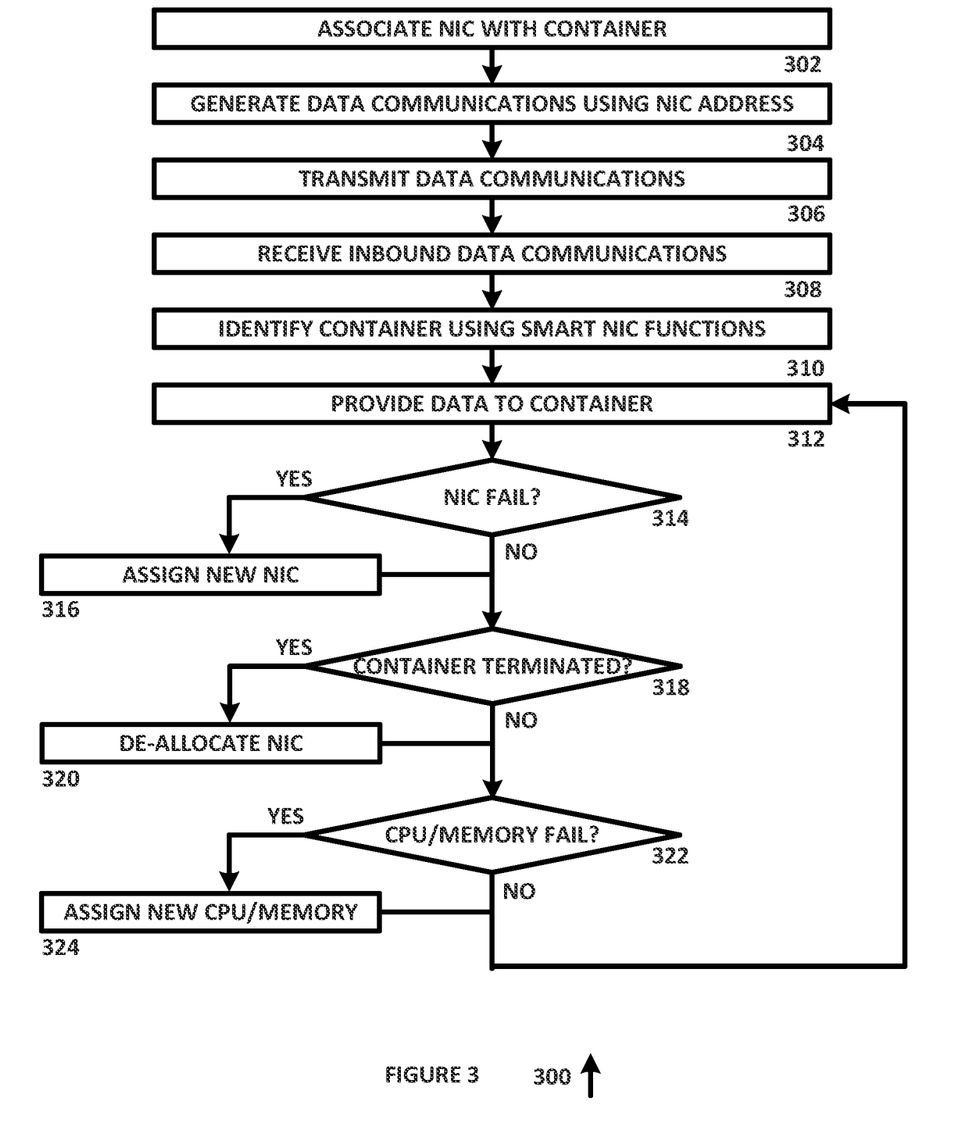
FIG. 3 is a diagram of an algorithm for managing distributed smart network interfaces, in accordance with an example embodiment of the present disclosure.

FIG. 3 is a diagram of an algorithm 300 for managing distributed smart network interfaces, in accordance with an example embodiment of the present disclosure. Algorithm 300 can be implemented in hardware or a suitable combination of hardware and software.

Algorithm 300 begins at 302, where a smart NIC is associated with a container. In one example embodiment, the process of algorithm 200 can be used to associate the smart NIC with the container, or other suitable processes can also or alternatively be used. The algorithm then proceeds to 304.

At 304, data communications are generated by the container and are addressed using the smart NIC address. In one example embodiment, an internal data network address can be used for communications between the container and the smart NIC that has been assigned to the container, a dedicated data bus can be used or other data communications techniques can also or alternatively be used. The algorithm then proceeds to 306.

At 306, data communications are transmitted from the allocated smart NIC to a remote address. In one example embodiment, the smart NIC can perform processing required to comply with a public network addressing protocol, can perform encryption and can perform other smart NIC functions as part of the data transmission process. The algorithm then proceeds to 308.

At 308, inbound data communications are received at the allocated smart NIC. In one example embodiment, a network address of the smart NIC can be used to communicate over a public network. Likewise, other suitable processes can also or alternatively be used. The algorithm then proceeds to 310.

At 310, a container is identified using the smart NIC functions. In one example embodiment, an address translation table can be used to extract additional identifying data from public network communications to allow the smart NIC to identify the container or other device or process that should receive the inbound data. Likewise, other suitable processes can also or alternatively be used. The algorithm then proceeds to 312.

At 312, the data is provided to the container from the smart NIC. In one example embodiment, the data can be provided over an internal network or data bus, or in other suitable manners. The algorithm then proceeds to 314.

At 314, it is determined whether the smart NIC has failed. In one example embodiment, smart NIC failure can be detected if a smart NIC management system determines that the data that is addressed to a container, device or other network component has not been received by that container, device or other network component, whether the data been misdirected, whether a smart NIC has failed to respond to a status message, whether a smart NIC has failed to transmit a status message, or other suitable processes can be used to determine whether a smart NIC failure has occurred. If it is determined that the smart NIC has failed, the algorithm proceeds to 316, where a new smart NIC is assigned. In one example embodiment, a new smart NIC can be assigned to each of the containers, devices or other network components that were previously supported by the failed smart NIC. In another example embodiment, the containers, devices or other network components that were previously supported by the failed smart NIC can be reassigned to two or more other smart NICs by the smart NIC management system as a function of loading, proximity or in other suitable manners. The algorithm then proceeds to 318. If it is determined at 314 that the smart NIC has not failed, the algorithm proceeds to 318.

At 318, it is determined whether the container has been terminated. In one example embodiment, a user can elect to terminate a container, such as by logging off a computing session or in other suitable manners. If it is determined that the container has been terminated, the algorithm proceed to 320 where the resources associated with the container are de-allocated, including the smart NIC. If it is determined that the container has not been terminated, the algorithm proceeds to 322.

At 322, it is determined whether a CPU or data memory device associated with the container has failed. If it is determined that a failure has occurred, then the algorithm proceeds to 324 where a new CPU or data memory is assigned. Otherwise, the algorithm returns to 312.

In operation, algorithm 300 can be used for managing distributed smart network interfaces and other suitable functions. Although algorithm 300 is shown as a flow chart, a person of ordinary skill in the art will recognize that algorithm 200 can also or alternatively be implemented using object-oriented programming, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing data, comprising: a compute node having a first processor that is configured to receive a digital data message containing a request for computing services and to allocate processing resources on a network as a function of the request; a smart network interface controller (NIC) management system operating on a second processor and configured to cause the second processor to select a smart NIC associated with the network and to allocate the smart NIC to the computing services; and the smart NIC includes a processor that is configured to interface with the network and to send and receive data over the network associated with the computing services, wherein the smart NIC management system is separate from the smart NIC.

2. The system of claim 1 wherein the computing services comprises a container having a network address and the smart NIC sends and receives data over the network as a function of the network address.

3. The system of claim 1 further comprising: the compute node configured to receive a second digital data message containing a second request for computing services and to allocate processing resources on the network as a function of the second request for computing services; and the smart NIC management system configured to cause the second processor to select a second smart NIC associated with the network to allocate to the second request for computing services.

4. The system of claim 3 wherein the second smart NIC includes a processor that is configured to interface with the network and to send and receive data over the network associated with the second request for computing services.

5. The system of claim 1 wherein the smart NIC management system is configured to monitor the smart NIC to determine whether a failure has occurred.

6. The system of claim 1 wherein the smart NIC management system is configured to monitor the smart NIC to determine whether a failure has occurred and to re-allocate the computing services to a different smart NIC.

7. The system of claim 1 wherein the smart NIC management system is configured to monitor the smart NIC to determine whether a failure has occurred and to re-allocate the computing services to a first different smart NIC and to re-allocate other computing services that were handled by the smart NIC to a second different smart NIC.

8. The system of claim 1 wherein the smart NIC management system is configured to monitor the computing services and to de-allocate the smart NIC when the computing services have terminated.

9. The system of claim 1 further comprising the compute node configured to receive a second digital data message containing a second request for computing services and to allocate processing resources on the network as a function of the second request for computing services.

10. The system of claim 9 further comprising the smart NIC management system configured to cause the second processor to instantiate a second smart NIC associated with the network to allocate to the second request for computing services.

11. A method for processing data, comprising: configuring a compute node having a first processor to receive a digital data message containing a request for computing services and to allocate processing resources on a network as a function of the request; configuring a smart network interface controller (NIC) management system operating on a second processor to cause the second processor to select a smart NIC associated with the network and to allocate the smart NIC to the computing services; and configuring a processor of the smart NIC to interface with the network and to send and receive data over the network associated with the computing services, wherein the smart NIC management system is separate from the smart NIC.

12. The method of claim 11 wherein the computing services comprises a container having a network address and further comprising configuring the smart NIC to send and receive data over the network as a function of the network address.

13. The method of claim 11 further comprising: configuring the compute node to receive a second digital data message containing a second request for computing services and to allocate processing resources on the network as a function of the second request for computing services; and configuring the smart NIC management system to cause the second processor to select a second smart NIC associated with the network to allocate to the second request for computing services.

14. The method of claim 13 further comprising configuring a processor of the second smart NIC to interface with the network and to send and receive data over the network associated with the second request for computing services.

15. The method of claim 11 further comprising configuring the smart NIC management system to monitor the smart NIC to determine whether a failure has occurred.

16. The method of claim 11 further comprising configuring the smart NIC management system to monitor the smart NIC to determine whether a failure has occurred and to re-allocate the computing services to a different smart NIC.

17. The method of claim 11 further comprising configuring the smart NIC management system to monitor the smart NIC to determine whether a failure has occurred and to re-allocate the computing services to a first different smart NIC and to re-allocate other computing services that were handled by the smart NIC to a second different smart NIC.

18. The method of claim 11 further comprising configuring the smart NIC management system to monitor the computing services and to de-allocate the smart NIC when the computing services have terminated.

19. The method of claim 11 further comprising configuring the compute node to receive a second digital data message containing a second request for computing services and to allocate processing resources on the network as a function of the second request for computing services.

20. The method of claim 19 further comprising configuring the smart NIC management system to cause the second processor to instantiate a second smart NIC associated with the network to allocate to the second request for computing services.

* * * * *